United States Patent Office 3,305,936
Patented Feb. 28, 1967

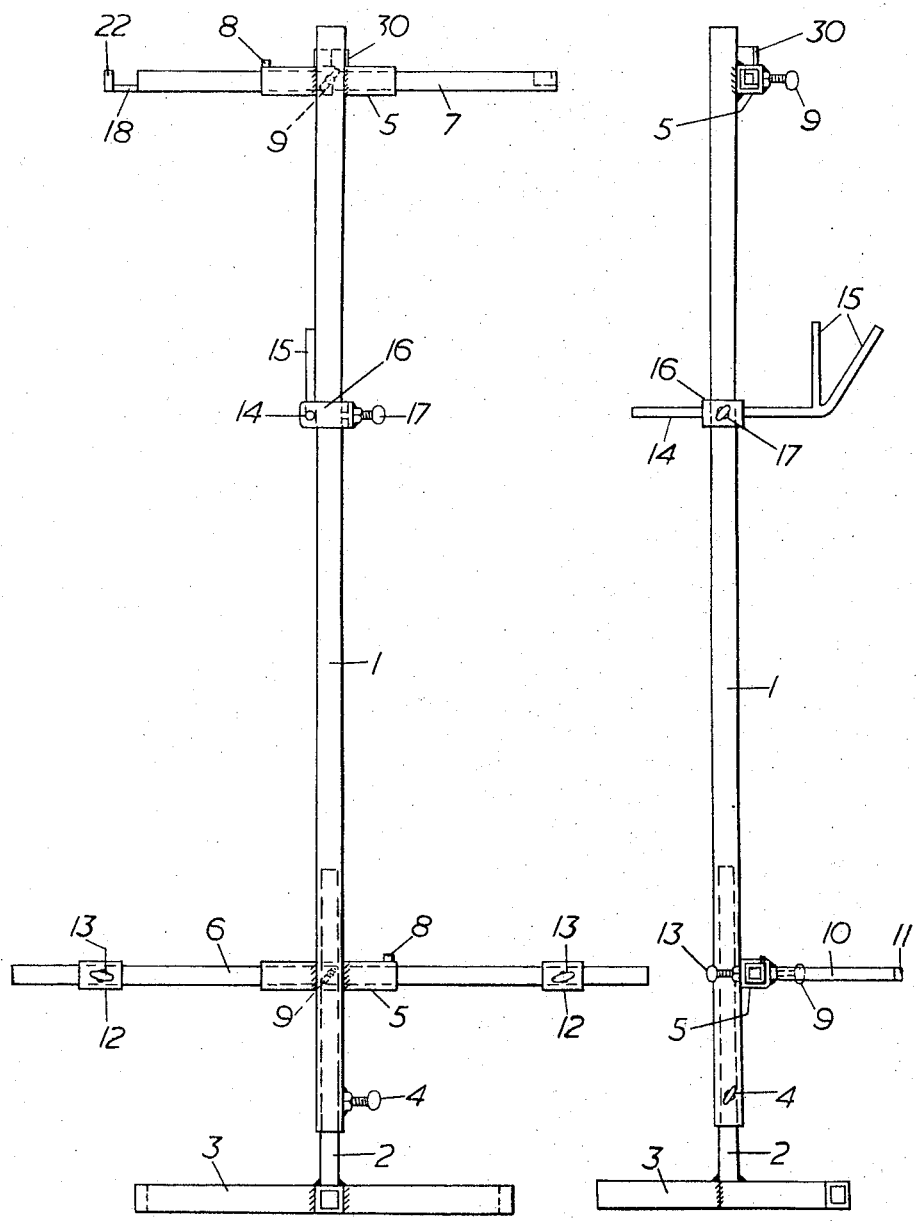

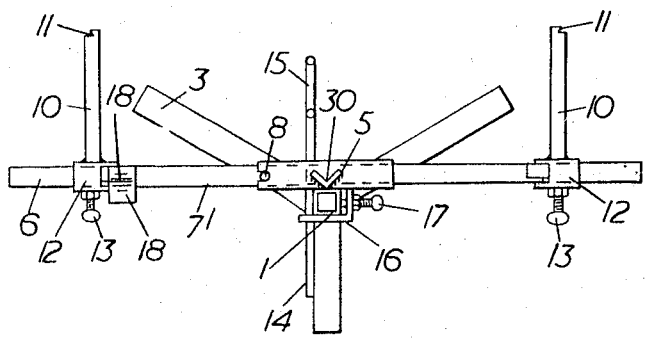
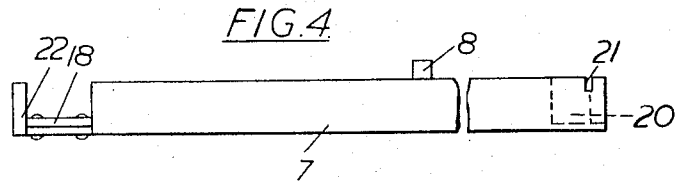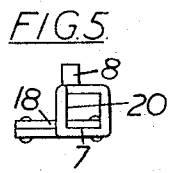
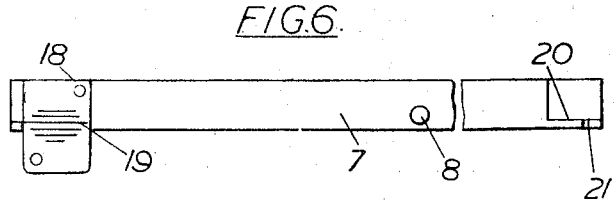
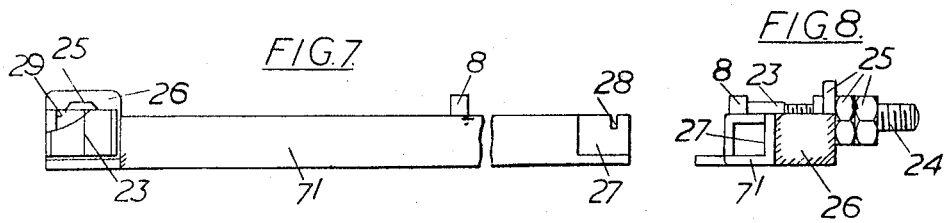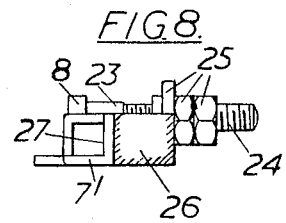
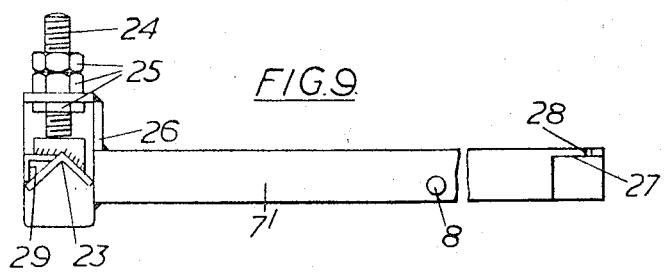
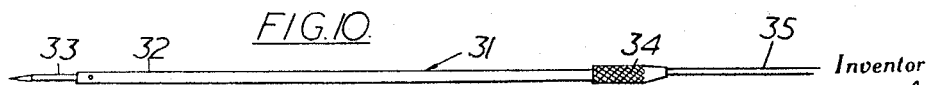

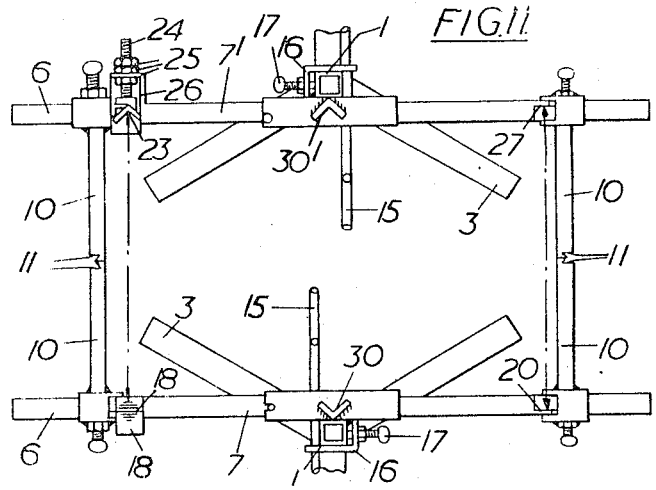
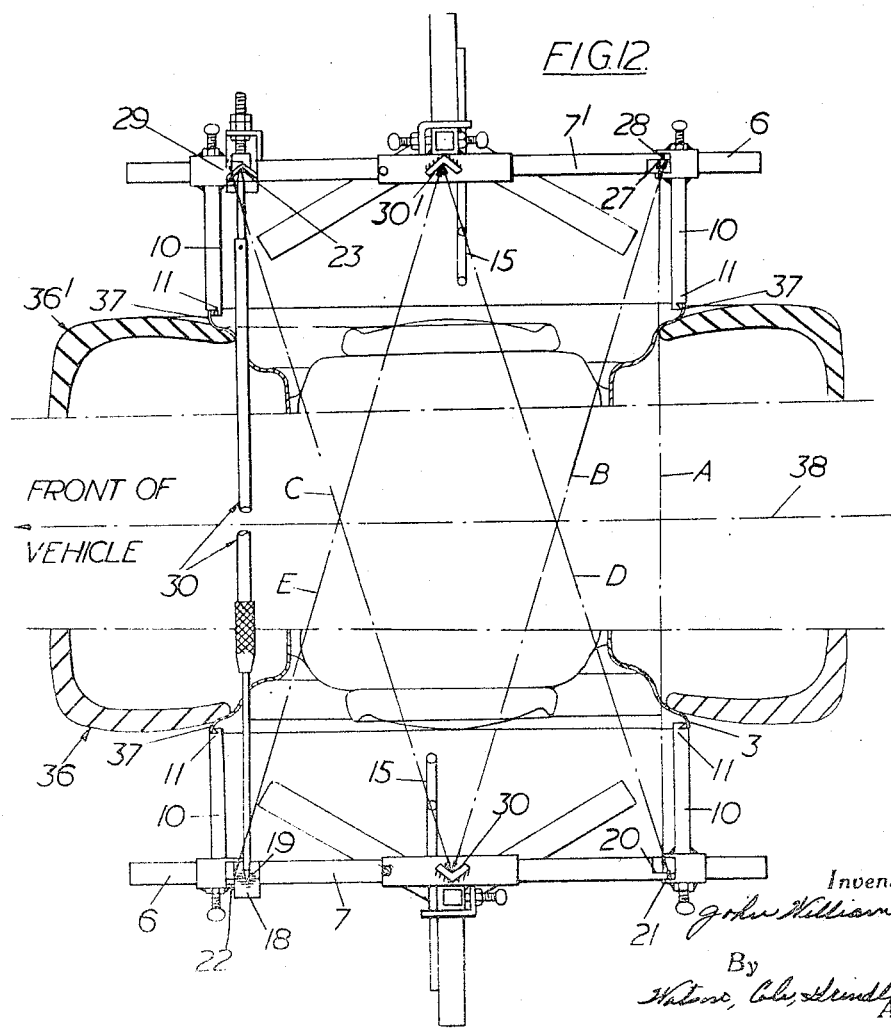

3,305,936
APPARATUS FOR CHECKING THE TRACKING OF THE FRONT WHEELS OF A MOTOR VEHICLE
John W. Dent, Sheffield, England, assignor to The Dentline Manufacturing Co. Limited
Filed Mar. 18, 1965, Ser. No. 440,860
9 Claims. (Cl. 33—203.17)

This invention relates to apparatus for checking the tracking of the front wheels of a motor vehicle.

According to the present invention, a tool for checking the tracking of the front wheels of a motor vehicle comprises a pair of assemblies each having a vertical post supporting two parallel horizontal beams, the lower of the beams having means thereon for aligning the assembly with one front wheel of a vehicle, so that toe-in or toe-out of the wheel relative to the other front wheel may be determined from the relative positions of the upper beam and the upper beam of the other assembly aligned with the other front wheel, the upper beams being at such a height above the lower beams so as to enable direct measurements between the upper beams to be made over the bonnet of the vehicle.

To enable the tool to be used on different diameters of wheels, the post of each assembly is preferably adjustably mounted on an individual base, so that the lower beam may be brought to the height of the centre of a wheel to be checked, and the means for aligning the assembly with the wheel comprises a pair of arms of equal length adapted to extend laterally from and be adjustable one along each end of the lower beam, so that the free ends of the arms may be set against opposite sides of the wheel rim. The aligning arms are preferably provided with locking means for securing them in adjusted position on the lower beams, and the free ends of the aligning arms are preferably notched for engagement with the wheel rim. Each post preferably carries a lateral arm with an upwardly-directed fork, the forked arm being adjustable vertically and laterally with respect to the post, so that the fork can be engaged with the front wing or wheel arch of a vehicle and thereby brace the assembly from the vehicle.

In order to be able to measure readily the amount of toe-in or toe-out of the wheels with respect to each other, one of the ends of one of the upper beams may be calibrated laterally by a horizontal scale, and the other end of that beam and the ends of the other upper beam are provided with vertical abutments facing normally to the axes of the beams, an adjustable gauge rod also being provided for setting to the distance between the vertical abutments on the one corresponding pair of ends of the upper beams and then comparing with the distance between the other vertical abutment and the datum of the calibrated scale on the other corresponding pair of ends of the upper beams. One of the vertical abutments is preferably adjustable laterally with respect to its beam, so that with the lower beams set parallel to each other, independently of a motor vehicle—as by bringing the free ends of the opposite pairs of the aforementioned aligning arms into abutting engagement with each other—the distance between the vertical abutment and the datum of the calibrated scale on the one corresponding pair of ends of the upper beams may be set equal to the distance between the vertical abutments on the other corresponding pair of ends of the upper beams.

According to a further and very advantageous feature of the invention, gauge marks are provided, one on each end of the upper beam of each assembly, at the same distance from their respective posts, and each post carries a central mark, the gauge marks enabling the alignment of either wheel to be checked by comparison of the measurements between each gauge mark of the assembly aligned with that wheel and the central mark of the assembly aligned with the other wheel. The gauge marks are conveniently provided by narrow vertical faces facing inwardly towards their respective posts. Each central mark may be a conical recess in the end of a lateral arm, for engagement by one end of the gauge rod while the other end of the gauge rod is adjusted to contact with one appropriate inwardly-facing vertical face and then while a note is made of how far that adjusted end falls short of or beyond the other appropriate inwardly-facing vertical face, the arm being axially adjustable for the purpose of bringing the central mark into vertical alignment with the axis of the king-pin of a wheel with which the assembly is aligned. However, if—as can be readily arranged—the wheels are in reasonably parallel alignment with the axis of the vehicle, the actual alignment of the wheels can be checked with great accuracy without bringing the central marks into vertical alignment with the king-pins, *provided* both marks are at substantially the same distance from their respective supporting posts 1. Thus, more conveniently, each central mark may be a fixed vertical V-shaped abutment on the post above the upper beam, for engagement by one end of the gauge rod while the other end of the gauge rod is adjusted to contact with one appropriate inwardly-facing vertical face and then while a note is made of how far that adjusted end falls short of or beyond the other appropriate inwardly-facing vertical face.

One embodiment of the invention will now be described, by way of example only, with reference to the accompanying drawings, in which FIGURE 1 is an elevation of one of the assemblies, the other assembly being identical except for substitution of a similar top beam with different ends, as will be described presently;

FIGURE 2 is an elevation from the right-hand side of FIGURE 1;

FIGURE 3 is a plan of FIGURE 1;

FIGURE 4 is an elevation to a larger scale showing the detail of the top beam of FIGURE 1;

FIGURE 5 is an elevation from the right-hand end of FIGURE 4;

FIGURE 6 is a plan of FIGURE 4;

FIGURES 7 to 9 correspond to FIGURES 4 to 6, but show the top beam used in the other assembly;

FIGURE 10 shows an adjustable gauge rod;

FIGURE 11 is a diagrammatic plan showing how the tool is checked before use; and FIGURE 12 is a diagrammatic plan showing use of the tool.

Referring to FIGURES 1 to 3, which show one of the two basically similar assemblies, each assembly has a vertical post 1 formed of square-section tubular steel fitting over a column 2, which is welded to a Y-shaped base 3 formed of three lengths of square-section tubular steel welded together, a thumb-screw 4 being carried by the post for locking the latter in any height-adjusted position on the column. A pair of sleeves 5, also of square-section tubular steel, welded cross-wise to the post 1, enable the post to support a lower beam 6 and an upper beam 7 or 7' (in the case of the other assembly). The beams 6, 7, 7' are made (preferentially) of square-section tubular steel of a size making an easy sliding fit in the sleeves 5, the column 2 being made (also preferentially) of the same material, and the beams are located in the sleeves by pins 8 and locked by thumb-screws 9 carried by the sleeves.

A pair of arms 10 (of each assembly) of equal length and with outwardly-facing notches 11 at one end, have their other ends welded to sleeves 12 slidable one along each end of the lower beam 6, the arms extending laterally from the beam and being secured in space adjusted position by thumb-screws 13 carried by the sleeves 12.

A lateral arm 14, with an upwardly-directed fork 15 extended in the same direction as the arms 10, is axially adjustable in a clamp 16 which is provided with a thumb-screw 17 serving both to lock the clamp in any height-adjusted position and to lock the forked arm in any axially-adjusted position.

The beam 7 is provided with a horizontal scale 18 (see also FIGURES 4 to 6), calibrated laterally in both directions from a datum 19, which is in line with a vertical abutment face 20 exposed on the other end of the beam by cutting away part of the tubular section. The outer face 21 of a notch (e.g., a saw-cut) in the abutment 20 serves (as will be described presently) as a guage mark at the same distance from the post 1 as a gauge mark 22 provided by a face formed when cutting away another part of the tubular section to accommodate the scale 18.

The beam 7' (FIGURES 7 to 9) is provided with a vertical V-shaped abutment 23 with a screwed stem 24 secured by nuts 25 in laterally adjusted position in a bracket 26 at one end of the beam, the other end of which is cut away to expose a vertical abutment face 27. The outer face 28 of a notch (e.g., another saw-cut) in the abutment 27 serves as a further gauge mark at the same distance from its corresponding post 1 as the gauge marks 21, 22 are from their post, and at the same distance from the post 1 as a gauge mark 29 provided by the inner face of one limb of a portion of angle-iron also carried by the screwed stem 24.

Each assembly is also provided with a central gauge mark 30 (in the case of the assembly shown in FIGURES 1 to 3) or 30' (in the case of the other assembly) is constituted by a fixed vertical V-shaped abutment on the post 1 above the sleeve 5 for the top beam 7 (or 7').

The only other item of equipment to complete the preferred embodiment of the tool is a gauge rod 31 (FIGURE 10) consisting of a length of tube 32, with a short pointed stem 33 at one end, and a collet 34 at the other, together with a long pointed rod 35 telescoping into the tube 32, the rod 35, being secured in adjusted position by means of the collet 34.

Before using the tool comprised by the two assemblies and the gauge rod, it is as well to check the alignment of the beams and adjust for any misalignment, e.g., due to distortion in welding the sleeves 5 to the posts 1, or occasioned by knocks during previous use or storage. As shown by FIGURE 11, this is a simple operation involving placing the assemblies face-to-face and with the notched ends 11 of the arms 10 touching in corresponding pairs, and then adjusting the position of the V-shaped abutment 23 until the distance from its inner intersection to the datum 19 of the scale 18 is exactly the same as the distance between the abutments 20, 27, both measurements being easily made by means of an ordinary scale or rule, although a short adjustable gauge rod similar to that shown in FIGURE 10 may be provided for the purpose.

Referring to FIGURE 12, setting up the tool for checking the tracking of the front wheels 36, 36' of a motor vehicle, is also a very simple operation, involving adjusting the post 1 of each assembly on its column 2 to bring the lower beams 6 to the height of the centres of the wheels, adjusting the arms 10 along the beams 6 until the notched ends 11 can be engaged with the wheel rims 37, and adjusting the forks 15 horizontally and vertically into engagement with the wheel fender arches (not shown).

The actual checking of the tracking is also a simple operation, involving setting the gauge rod 31 to the distance A between the abutments 20, 27 and comparing with the distance between the abutment 23 and the datum 19 of the scale 18 (the gauge rod being shown in this latter position in FIGURE 12), the scale giving an indication of the amount of toe-in or toe-out, as the case may be, of the wheels with respect to each other. The alignment of the wheel 36' is checked by setting the gauge rod 31, over the hood or bonnet of the vehicle, to the distance B between the central mark 30 on the one assembly and the gauge mark 28 on the other assembly, and noting how far that adjusted length falls short of or exceeds the distance C between the central mark 30 and the gauge mark 29, or vice versa; and the alignment of the wheel 36 is checked by setting the gauge rod 31 to the distance D between the other central mark 30' and the gauge mark 21, and noting how far that adjusted length falls short of or exceeds the distance B between the central mark 30' and the gauge mark 22, or vice versa. Greater misalignment of one wheel is indicated by a greater difference between the distances B and C and the distances D and E.

Since all the distances measured are relative to the positions of the wheels, and *not* dependent on the positions of the wheels relative to the vehicle—except insofar as reasonable parallel alignment may be necessary, as described above—and since the upper beams are always parallel to the lower beams, which are aligned with the wheels, slight, yet appreciable unevenness of the ground on which the vehicle and the assemblies are standing does not affect the accuracy with which the alignment of the wheels can be checked.

What I claim is:

1. A tool for checking the tracking of the front wheels of a motor vehicle comprising a pair of assemblies each having an individual base, a vertical post vertically adjustable on each base, upper and lower parallel horizontal beams carried by each post, and arms of equal length extending laterally from and adjustable one along each end of each lower beam, the upper beams being spaced from the lower beams to an extent enabling direct measurements between the upper beams to be made over the hood of a vehicle when the lower beams are brought to the height of the centres of the front wheels of the vehicle, with the free ends of the arms set against opposite sides of the respective front wheel rims.

2. A front wheel tracking tool as in claim 1, wherein the arms are provided with locking screws for securing them in adjusted position on the lower beams, and the free ends of the aligning arms are notched for engagement with the wheel rims.

3. A tool for checking the tracking of the front wheels of a motor vehicle comprising a pair of assemblies each having an individual base, a vertical post vertically adjustable on each base, upper and lower parallel horizontal beams carried by each post, arms of equal length extending laterally from and adjustable one along each end of each lower beam, a notch in the free end of each arm, locking screws for securing the arms in adjusted position, and an upwardly-directed fork extended laterally from and adjustable both vertically and laterally with respect to each post, the upper beams being spaced from the lower beams to an extent enabling direct measurements between the upper beams to be made over the hood of a vehicle when the lower beams are brought to the height of the centres of the front wheels of the vehicle, with the notched ends of the arms engaged with opposite sides of the respective front wheel rims, and with the upwardly-directed forks engaged with the respective front wheel fender arches.

4. A tool for checking the tracking of the front wheels of a motor vehicle comprising a pair of assemblies each having a vertical post, upper and lower parallel horizontal beams carried by each post, and wheel-engaging means on each lower beam for aligning the lower beams one with each front wheel of a vehicle, the upper beams being spaced from the lower beams to an extent enabling direct measurements between the upper beams to be made over the hood of a vehicle, one end of one of the upper beams being calibrated laterally by a horizontal scale having spaced datum lines, and the other end of that beam and the ends of the other upper beams being provided with vertical abutments facing normally to the axes of the beams, in combination with an adjustable gauge rod for setting to the distance between the vertical abutments on the one corresponding pair of ends of the upper beams and then for comparing with the distance between the other vertical abutment and the datum lines of the horizontal scale.

5. A front wheel tracking tool as in claim 4, wherein is provided means for adjusting one of the vertical abutments laterally with respect to its beam, so that with the lower beams set parallel to each other, independently of a motor vehicle, the distance between the vertical abutment and the datum lines of the horizontal scale may be set equal to the distance between the corresponding pair of vertical abutments.

6. A tool for checking the tracking of the front wheels of a motor vehicle comprising a pair of assemblies each having a vertical post, upper and lower parallel horizontal beams carried by each post, and wheel-engaging means on each lower beam for aligning the lower beams one with each front wheel of a vehicle, the upper beams being spaced from the lower beams to an extent enabling direct measurements between the upper beams to be made over the hood of a vehicle, together with gauge marks provided one on each end of each upper beam at the same distance from their respective posts, and a central mark carried by each post, for alignment of the wheels to be checked by comparison of the measurements between each gauge mark of each assembly and the central mark of the other assembly.

7. A tool for checking the tracking of the front wheels of a motor vehicle comprising a pair of assemblies each having a vertical post, upper and lower parallel horizontal beams carried by each post, and wheel-engaging means on each lower beam for aligning the lower beams one with each front wheel of a vehicle, the upper beams being spaced from the lower beams to an extent enabling direct measurements between the upper beams to be made over the hood of a vehicle, together with a horizontal scale calibrated laterally on one end of one upper beam, vertical abutments facing normally to the axes of the beams on the other end of that upper beam and on the ends of the other upper beam, narrow vertical faces provided one on each end of each upper beam at the same distance from and facing towards their respective posts, a fixed vertical V-shaped abutment on the post above each upper beam, in combination with an adjustable gauge rod for comparing the distances between the appropriate pairs of vertical abutments and between the appropriate pairs of vertical faces and the V-shaped abutments.

8. A tool for checking the tracking of the front wheels of a motor vehicle comprising a pair of assemblies each having an individual base, a vertical post vertically adjustable on each base, upper and lower parallel horizontal beams carried by each post, arms of equal length extending laterally from and adjustable one along each end of each lower beam, a notch in the free end of each arm, locking screws for securing the arms in adjusted position, and an upwardly-directed fork extending laterally from and adjustable both vertically and laterally with respect to each post, the upper beams being spaced from the lower beams to an extent enabling direct measurements between the upper beams to be made over the hood of a vehicle when the lower beams are brought to the height of the centres of the front wheels of the vehicle, with the notched ends of the arms engaged with opposite sides of the respective front wheel rims, and with the upwardly-directed forks engaged with the respective front wheel fender arches, together with a horizontal scale calibrated laterally on one end of one upper beam, vertical abutments facing normally to the axes of the beams on the other end of that upper beam and on the ends of the other upper beam, narrow vertical faces provided one on each end of each upper beam at the same distance from and facing towards their respective posts, a fixed vertical V-shaped abutment on the post above each upper beam, and an adjustable gauge rod for comparing the distances between the appropriate pairs of vertical abutments and between the appropriate pairs of vertical faces and the V-shaped abutments.

9. A front wheel tracking tool as in claim 8, wherein is provided means for adjusting one of the vertical abutments laterally with respect to its beam, so that with the lower beams set parallel to each other, independently of a motor vehicle, the distance between the vertical abutment and the datum of the calibrated scale may be set equal to the distance between the corresponding pair of vertical abutments.

References Cited by the Examiner

UNITED STATES PATENTS

| | | | |
|---|---|---|---|
| 1,209,345 | 12/1916 | Smith | 33—203.17 |
| 2,108,383 | 2/1938 | Morse | 33—203.12 |
| 2,564,510 | 8/1951 | Shoemaker | 33—203 X |
| 2,624,950 | 1/1953 | Mitchell | 33—180 |
| 2,853,794 | 9/1958 | Van Winkle | 33—203.17 |
| 2,882,608 | 4/1959 | Tursman | 33—203.18 |
| 2,899,753 | 8/1959 | Hair | 33—203.21 |

LEONARD FORMAN, *Primary Examiner.*

W. D. MARTIN, *Assistant Examiner.*